UNITED STATES PATENT OFFICE.

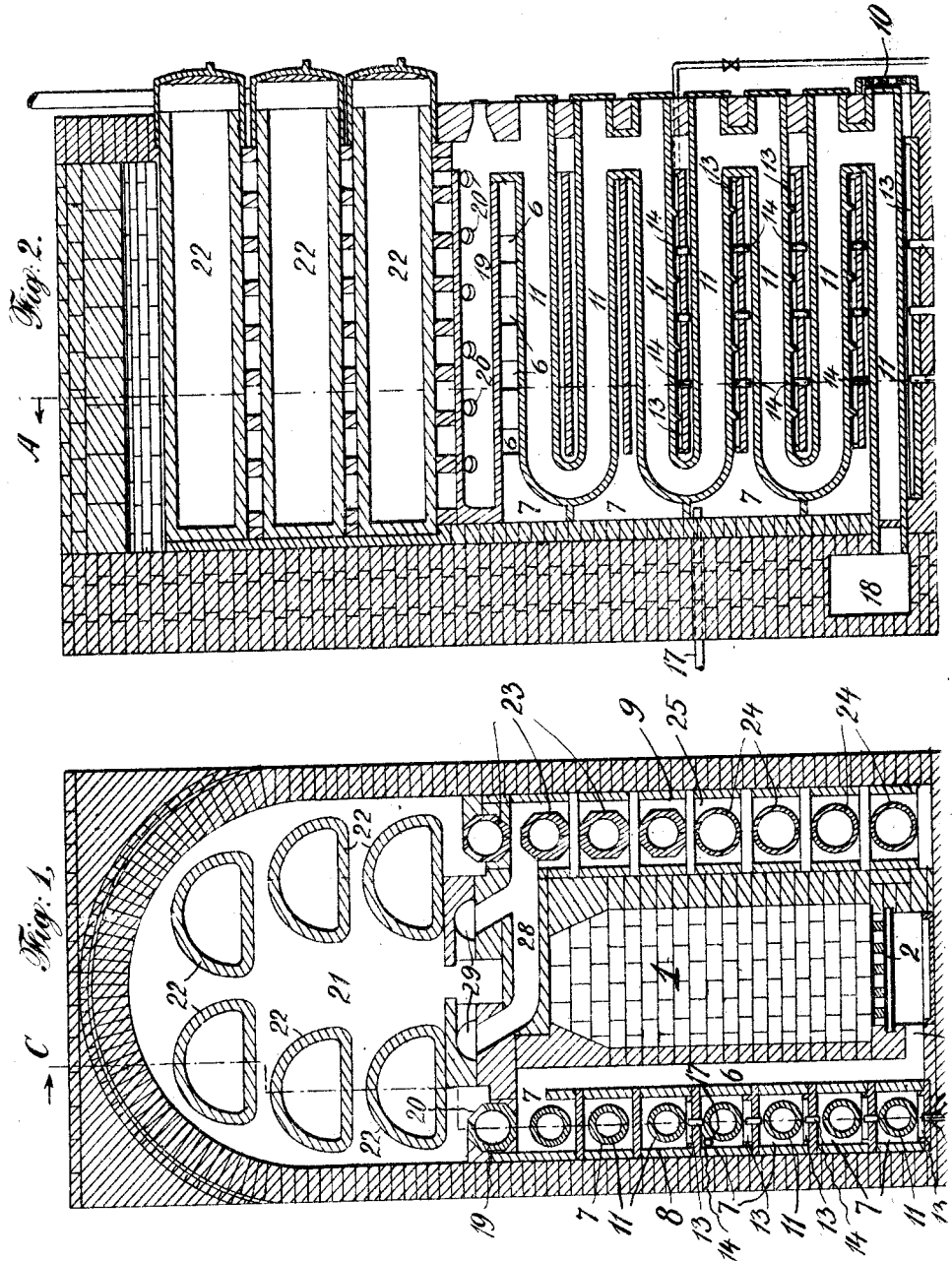

HENRY L. DOHERTY, OF NEW YORK, N. Y.

PROCESS OF COMBUSTION AND HEAT REGULATION AND REGENERATION.

1,123,500.  Specification of Letters Patent.  Patented Jan. 5, 1915.

Original application filed March 16, 1908, Serial No. 421,503. Divided and this application filed April 21, 1911. Serial No. 622,549.

*To all whom it may concern:*

Be it known that I, HENRY L. DOHERTY, a citizen of the United States of America, and a resident of the borough of Manhattan, city, county, and State of New York, have invented a certain new and useful Process of Combustion and Heat Regulation and Regeneration, of which the following is a specification.

My invention relates to a process of regulating the temperature of combustion in a gas producer furnace, and of preheating the air therefor; and my invention relates particularly to processes of combustion, to be carried out in gas producer furnaces, wherein water vapor is used to keep down the temperature in the producer.

The objects of my invention are the efficient regulation of the temperature in the producer, and increased economy of operation obtained by returning to the producer the greater part of the heat of the gases from the combustion of the gas producer, and the vaporization of water used in the process, by waste heat, instead of, as heretofore, by heat abstracted from the producer.

My invention can be carried out in any combination of a gas producer and gas consuming furnace in which the two are functionally connected, so that the gas from the producer is burned directly in the furnace as it is formed, and in which the products of combustion can be introduced at substantially the temperature at which they leave the furnace, into recuperators for preheating the air required for the producer and for the combustion of the gas, and for the vaporization of the water used in the process. As a particular illustration of apparatus in which my process may be carried out I have selected a furnace for heating retorts for the making of illuminating gas—such furnaces being commonly termed gas-benches. I have selected this type of apparatus for the reason that it furnishes ideal conditions for the operation of the process; but there are a great many other well known types of furnaces in connection with which my invention can be used with great advantage. For instance, it can be employed in gas producers used in connection with zinc furnaces, reheating furnaces, etc.

As set forth in my Patent No. 829,105, dated August 21, 1906, in the operation of a gas producer it is necessary to provide some means for keeping down the temperature of the fuel bed in the producer. The reaction on which the formation of producer gas principally depends is that occurring when carbon is burned with a supply of air insufficient for complete combustion, namely,

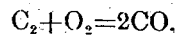

This is a highly exothermic reaction, 4450 B. T. U. being liberated for every pound of carbon burned. According to the process of my said prior patent, this excess of heat is absorbed by the endothermic reaction involved in the reduction of carbon dioxid to carbon monoxid and the combination of the liberated atom of oxygen with carbon

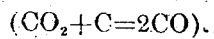

Prior to such patented process, however, it was the custom to absorb the excess heat by the vaporization of water and the dissociation of the elements of water; and in some cases the use of water as described to keep down the producer temperature is still preferred. As water has commonly been used for such purpose heretofore, its use has been attended with great waste of heat, due largely to the fact that the vaporization of the water has been done either in a separate boiler (requiring the combustion of fuel for the special purpose of vaporizing such water), or by heat taken from the producer itself; as for example, by passing the entering draft current of air over a body of water heated by the fuel bed in the producer, or by introducing air and water into the ash-pit of the producer, the water being converted into steam by absorption of latent heat taken from the fuel in the producer itself. There is, broadly speaking, no loss of heat in the system due to dissociation of steam into its elements, the heat absorbed in dissociation being returned to the cycle in the subsequent recombination of the elements in the furnace. So far as the producer is concerned, therefore, there is no loss of heat due to the introduction of steam into the producer save that required to heat the steam from the temperature at which it is introduced to that at which the waste gases leave the furnace; and this loss is only serious when the water vapor or steam is supplied in such quantity and the temperature of the producer is so low that a large proportion of it goes through the producer undecomposed. But if the water must be vaporized into steam by heat taken directly from the fuel in a boiler, or in any other way than by the utilization of otherwise wasted heat, a considerable loss, which may be avoided by the means herein described, necessarily results.

Ordinarily, in producers operating with a draft current of air and water vapor or steam, the air has been supplied to the producer with little or no previous heating. It is clear that the heat absorbed in heating this air up to the temperature at which the waste gases are discharged, is so much heat abstracted from that which the producer is capable of converting into useful potential heat in the producer gas. In the great majority of cases where producer gas is applied to the heating of furnaces, etc., the products of combustion leave the apparatus at a temperature above 1000° F. Even where recuperators are employed to conserve part of this heat carried out of the furnace, the temperature of the waste gases is seldom reduced below 800° F. If the air enters the producer at 60° F. this means, even when the waste gases are reduced to 800° F., a loss of over 2500 B. T. U. more or less per pound of carbon gasified in the producer.

Assuming that the waste or flue gases leave the furnace at a temperature of 1000° (which is a much lower temperature than is generally obtained even when regenerators are used) there is a loss of sensible heat in the gases of 3135 B. T. U. more or less. By the method herein described and illustrated, I utilize a large part of this heat of the waste gases to raise the temperature of the secondary air and also to raise the temperature of the primary air and to vaporize water, the resulting steam being mixed with such primary air; and I am thus enabled to return to the producer the greater part of the waste heat in the products of combustion and thereby I greatly increase the economy of operation and the efficiency of the apparatus. The vaporization of the water and heating up of incoming draft currents being no longer required to be done to any considerable degree by heat derived from the producer itself, a greater proportion of steam may be dissociated in the producer and therefore a greater proportion of the heat generated in the producer is returned to the cycle by the subsequent recombination of hydrogen and oxygen in the furnace; also the calorific value of gas issuing from the producer into the furnace is higher.

It is important to superheat the water vapor to a high degree, to facilitate its decomposition in the producer; and it is also important to mingle the water vapor thoroughly with the air; and furthermore it is particularly desirable to conduct the evaporation of the water in connection with the heating of the air and during the earlier stages of such heating, for during such evaporation the consequent absorption of latent heat keeps down the temperature to a relatively low point, so that there is a relatively great temperature-difference between the air and waste gases, the latter already cooled considerably during their passage through the upper sections of the recuperator, so that a relatively larger proportion of contained heat is abstracted from the waste gases than would be the case if the evaporation were done after the air had already been heated to a high degree. In other words, by doing the evaporation of the water by waste gases which have already parted with a large proportion of their heat in superheating the water vapor to a high degree and in heating the air to a high degree, heat is utilized efficiently which would otherwise be relatively unavailable, owing to the relatively low temperature of the waste gases. It is obvious that there cannot be an efficient interchange of heat between relatively cool waste gases and a body of water when the latter is separated from the waste gases by thick metal walls, such as are necessary when the water is evaporated in a boiler set into the recuperator. This difficulty I avoid, according to my invention, by providing the air passages of the recuperator with water-supply means, so that the air in passing through these passages itself evaporates the water, taking up the water vapor as fast as formed and so greatly facilitating the liberation of more vapor, and also keeping the air relatively cool and relatively moist in the early stages and so in a relatively good condition to take up heat from the already partly-cooled waste gases. The absorption of the water vapor as fast as formed by the air results in a particularly thorough admixture of the air and water vapor, which is particularly favorable to efficient action of both in the fuel-bed of the producer.

Referring now to the accompanying drawings showing a gas bench adapted for the carrying out of my process, Figure 1 shows a vertical transverse section, looking from the front, on the line A—B of Fig. 2, and Fig. 2 represents a longitudinal section on the irregular section C—D of Fig. 1.

The drawings represent a single retort furnace or bench with its gas producer. In practice the benches are always built together in groups or batteries, two benches being placed back to back forming a twin furnace or bench setting. Any number of these twin benches may be built together side by side. For the purpose of illustrating my invention, however, it is sufficient to represent simply a single individual bench.

In the drawings 1 designates the gas producer having a grate 2 for supporting the fuel bed of the producer. The fuel may either be coal, or coke remaining from the distillation of the coal used in the retorts. In practice a bed of ashes is allowed to accumulate on the grate to a considerable depth, a bed of ignited fuel being above this bed of ashes. As is usual in producer practice, the depth of the fuel bed is, generally, considerable, since by using a considerable depth of fuel a gas of much better and more uniform quality is secured.

The air for the partial combustion which takes place in the producer, is admitted through ports 5 under the grate 2, which ports communicate by a passage or flue 6 with the upper longitudinal flue 7 of the primary recuperator 8. This primary recuperator comprises a series of flues 7 within which are other flues (usually metal pipes) 11, through which a portion of the products of combustion from the furnace pass in escaping to the stack. The primary air to be heated enters the lowermost of the flues 7 through a suitable damper or register 10, and thence passes upward through the various flues 7, and around the heating flues 11, each flue 7, except the last, being connected to the flue 7 next above it, the connections being alternately in front and in rear, so that the flues 7 in principle form a return bend passage for the air. The various heating pipes 11 are likewise connected in series so as to form in principle a return-bend heating coil. The uppermost of the flues 7 is connected to the passage 6. In several of the lower flues 7 are water pans 13 provided with overflow connections 14, whereby when the water level in any pan rises above the level of such overflow connection the surplus passes through such overflow connection, over the heating pipe 11 below, to the pan beneath and so until the last pan is reached. The overflow connections of this last pan connect with a waste pipe 16. These pipes over which the water drips may be provided on their under sides with transverse ribs to prevent the water from traveling endwise on them, and so dropping mainly from one end or the other of the pipes. It is of course desirable that the fall of the water from the pipes shall be fairly uniform. In case there is reason to believe that at times moisture communicated to the air during its passage through the flues 7 by the evaporation of the water in said pans, may not be sufficient for the purpose desired, an auxiliary steam supply may be provided, for example, a steam pipe 17, opening into one of the flues 7. The lowermost of the pipes 11 communicates with an offtake flue 18. The uppermost of the pipes 11 connects with a flue 19, preferably of refractory material, having ports 20 leading into the furnace or combustive chamber 21 within which are the various retorts 22. The hot combustion gases from this furnace 21 enter the flue 19 at or above 2000° F. usually, and during their passage downward through the recuperator 8, they give up a large part of their sensible heat to the entering air current surrounding them and flowing upward in a direction the reverse of the downward flow of these products of combustion. Such entering air current is therefore highly heated and returns to the producer a large part of the sensible heat of the products of combustion which would otherwise be lost. A further portion of the heat of these products of combustion is utilized in the evaporation of water in the pans 13 and of moisture picked up by the air current; all of the water carried by the air current being therefore converted into steam which usually is highly superheated by the time the air has passed through outlet 5 into the ash pit. By these two methods of absorbing and utilizing the waste heat of the portion of the products of combustion passing through the recuperator 8, a very large proportion of the available heat of such waste gases is utilized.

It will be apparent that not only will the water vapor be mixed most thoroughly with the primary air, but that the proportion of water vapor to air will be practically constant so long as the feed of water or steam to the compartments of the primary recuperator is constant; also, that the proportion of water vapor to the air may be varied within wide limits, by supplying water to more or less of the pans 13. In this way the proportion of water to air may be varied so that the steam is highly superheated after leaving the recuperator, or that the air is merely saturated, or that it carries a large excess of water. Thereby the temperature in the producer may be regulated as desired.

The secondary recuperator 9, upon the opposite sides of the furnace, comprises, in its upper part, flues 23, preferably of refractory material, and, in its lower part, pipes 24, preferably of metal. These flues 23 and 24 are located in a vertical flue 25. It will be understood that, as is common in recuperator practice, the flues 23 and 24 are connected end to end to form a return bend conduit. I do not further illustrate the construction of this secondary recuperator 9, as the principle of such recuperator is well understood, and since the said recuperator is fully illustrated and described in my Patent No. 993,322, dated May 23, 1911, of which this present application is a division.

In the secondary recuperator 9, secondary air is heated in passing vertically through the flue 25, by contact with the flues 23 and 24, through which products of combustion from furnace chamber 21 pass successively. The secondary air so heated passes through flues 28 to nostrils 29, there encountering combustible gas rising from producer 1, causing the combustion of such gas within chamber 21 and around the retorts 22, one part of the resulting products of combustion passing out through recuperator 8 and the other part passing outward through recuperator 9, as above described.

Heating the primary and secondary air by separate currents of products of combustion, passing directly from the furnace chamber 21 into the primary recuperator, and secondary recuperator, respectively, has numerous advantages over the common hitherto-prevailing practice where both primary and secondary recuperators are used, according to which former practice the primary recuperator is heated by furnace gases which have already passed through the secondary recuperator and have parted therein with much of their heat, and therefore reach the primary recuperator at a relatively low temperature as compared with the temperature at which the furnace gases enter the primary recuperator, according to my invention. In such former apparatus in which water vapor is added to the primary air, such water vapor has usually been evaporated in a separate boiler by a separate source of heat, or else such water vapor has been obtained by evaporation from a pool of water in the ash pit, the evaporation from such pool being due mainly to the heat of cinders dropping from the fuel bed, and to heat radiated downward from the fuel bed. It will be clear that in such former apparatus the water vapor supplied to the fuel bed in the producer is in no sense proportional in amount to the amount of air passing through the primary recuperator; and that the proportion of water vapor to primary air may vary greatly and undesirably; also such water vapor carried by the primary air into the fuel bed can have received little or no superheat before reaching the fuel bed, and the primary air will in turn be chilled to nearly the boiling point of water in passing over the pool of water in the ash pit. In my process, however, the proportion of water vapor to air will be practically constant so long as the feed of water or steam to the compartments of the primary recuperator is constant; also the proportion of water vapor to air may be varied within wide limits, in my process, by supplying water to more or less of the pans 13, or by regulating the flow of steam through the steam inlet 17. In this way the proportion of water to air may be varied so that the steam is highly superheated after leaving the recuperator, or that the air is merely saturated or that it carries a large excess of water. Thereby the temperature within the fuel bed of the producer may be regulated as desired, and as may be required, with different kinds of fuel, to limit the temperature of the fuel bed so that clogging of the fuel bed by slag may be avoided.

A further advantage of admitting water or water vapor to the initial or low temperature stages of the primary recuperator, and of heating this primary recuperator by an independent current of products of combustion taken directly and at high temperature from the furnace chamber 21, is that there is a greater temperature difference available for the transfer of heat from such current of products of combustion to the primary air, than is the case when the products of combustion for the primary recuperator pass first through a secondary recuperator before reaching the primary recuperator. Transfer of heat from one body to another takes place at a rate which, in general, is proportional to the difference in temperature of the two bodies. If the difference in temperature of the two bodies is low the rate of transfer will be low. From this it follows that, if the products of combustion for heating the primary recuperator have already parted with a large part of their heat in a secondary recuperator, before reaching the primary recuperator, their temperature by the time they have reached the primary recuperator will be so low that the transfer of heat from such products of combustion to the primary air will take place somewhat slowly and therefore the primary air can take relatively little of the heat from such products of combustion, as compared with the heat which the primary air takes from the products of combustion, in an apparatus operating according to my process herein described.

The net results of my process are, that I am able to control the temperature of the fuel bed in the producer with greater certainty by being able to evaporate, by waste heat alone, a greater proportion of water than is possible when the water is evaporated by contact of the primary air with the water in the ash pit and by radiation of heat from the fuel bed in the ash pit; that the proportion of water vapor to primary air remains practically constant for any one adjustment; and therefore I am able to use without slagging, coals which could not well be used in former apparatus because of the difficulty from slagging. Furthermore, the heat employed for evaporating the water is not drawn from a separate source and therefore produced at a separate expense, nor is it drawn from the fuel bed itself, but is heat that would otherwise be wasted.

For the production of a high proportion of carbon monoxid, it is essential that the fuel bed shall be maintained at a high temperature; yet when using American coal, exceeding a certain temperature close to that at which it is desired to maintain the fuel bed, will cause excessive formation of clinker with resulting great waste of fuel and possible complete clogging of the producer. When the primary air picks up the water vapor only while passing through the ash pit, it is impossible to maintain closely the required proportion of air and endothermic agent (water) in the primary draft current, and variable operation of the producer results. But when the water vapor is added in the early stages of the recuperator itself, as in my process a nice regulation of the proportion of water vapor and the degree of superheat is easy to attain and it is easy to maintain these proportions practically constant; so that for these reasons it is quite permissible, in my producer, to keep the fuel bed much nearer the clinkering point than would be permissible otherwise. This is particularly important for the reason that there is a critical temperature, which, if slightly exceeded, results in a greatly increased yield of the carbon monoxid. But this critical temperature is close to the slagging point of many American coals, for which reason it has been impossible, without the nice regulation of the proportion of air to water permitted by my method above described, to exceed this critical temperature, when using slagging fuel such as referred to.

What I claim is:—

1. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating air for the draft supply of the producer by the heat of one of said currents, evaporating moisture by the heat of such current, while such moisture is in heat transferring relation to the air heated by the same current, and mingling the water vapor so produced with such air and thereby maintaining, between such air and such current, a relatively great difference of temperature, and preheating air for combustion with the producer gas by heat of the other of said currents.

2. The herein described process which comprises passing through a bed of fuel in a gas producer, a heated primary current of mixed air and water vapor, mingling with the gas so produced, a heated secondary current of air, burning the mixture in a furnace chamber and dividing the resulting products of combustion into two currents, and passing said currents through separate recuperators, one for the primary current and the other for the secondary current, and supplying air and moisture for the primary current to the primary recuperator and air for the secondary current to the secondary recuperator, and highly superheating the water vapor supplied to the primary air, by the heat transferred from the corresponding current of products of combustion to said primary air in the primary recuperator.

3. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and introducing water vapor into a portion of the primary air current in which such heat exchange is occurring, and thereby maintaining, between such portion of the primary air current, and the corresponding portion of the corresponding products of combustion current, a relatively great difference of temperature, facilitating the abstraction of heat from such products of combustion.

4. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and introducing water vapor into an early low temperature portion of the primary air current in which such heat exchange is occurring, and thereby maintaining between such portion of the primary air current, and the corresponding portion of the corresponding products of combustion current, a relatively great difference of temperature facilitating the abstraction of heat from such products of combustion current.

5. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and evaporating water in a portion of the primary air current in which such heat exchange is occurring by the heat so communicated to the primary air, and thereby maintaining, between such portion of the primary air current, and the corresponding portion of the corresponding products of combustion current, a relatively great difference of temperature, facilitating the abstraction of heat from such products of combustion.

6. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and evaporating water in an early low temperature portion of the primary air current in which such heat exchange is occurring, by heat so communicated to the primary air, and thereby maintaining between such portion of the primary air current, and the corresponding portion of the corresponding products of combustion current, a relatively great difference of temperature facilitating the abstraction of heat from such products of combustion current and highly superheating the water vapor so carried by the primary air current by heat transferred by the early portion of the corresponding current of products of combustion to such primary air current.

7. The herein described process which comprises passing a draft current of mixed water vapor and heated air through a bed of fuel of effective gasifying depth in a gas producer, mixing with the resulting producer gas heated air and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, introducing water vapor to a portion of the primary air current in which such heat exchange is occurring, and regulating the temperature and moisture-content of the primary air, with respect to the characteristics of the fuel used in the producer, by regulating the proportion to the primary air of the water vapor so supplied to such primary air.

8. The herein described process which comprises passing a draft current of mixed water vapor and heated air through a bed of fuel of effective gasifying depth in a gas producer, mixing with the resulting producer gas heated air, and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and maintaining a substantially constant water-content in the primary air by supplying water to be evaporated to such primary air, during the exchange of heat between the primary air and the products of combustion, and permitting such primary air to evaporate so much of such moisture as it may.

9. The herein described process which comprises passing a draft current of mixed water vapor and heated air through a bed of fuel of effective gasifying depth in a gas producer, mixing with the resulting producer gas heated air, and burning the gas in a furnace chamber, and dividing the resulting products of combustion into two currents, preheating secondary air for combustion with the producer gas by the heat of one of said currents, preheating primary air for the draft supply of the producer by exchange of heat with the other of said currents, and maintaining a substantially constant water-content in the primary air by supplying water to be evaporated to an early low temperature portion of such primary air, during the exchange of heat between the primary air and the products of combustion, and permitting such primary air to evaporate so much of such moisture as it may.

10. The herein described process which comprises passing a draft current of mixed highly superheated water vapor and highly heated air through a bed of fuel of effective gasifying depth in a gas producer, mingling with the resulting producer gas heated air and burning the gas in a furnace chamber, preheating air for the draft supply of the producer and mingling water vapor with such draft supply after such air has been so heated to a considerable degree and highly superheating such water vapor by exchange of heat with products of combustion of the gas so burned in said furnace chamber.

In testimony whereof I have signed this specification in the presence of two subscribing witnesses.

HENRY L. DOHERTY.

Witnesses:
 FRANK L. BLACKBURN,
 THOS. I. CARTER.